UNITED STATES PATENT OFFICE.

CHARLES E. PARSONS, OF MEDFORD, MASSACHUSETTS, ASSIGNOR TO THE BRUNSWICK ANTIMONY COMPANY, OF NEW BRUNSWICK, CANADA.

METHOD OF PRODUCING GOLDEN SULPHURET OF ANTIMONY.

SPECIFICATION forming part of Letters Patent No. 278,816, dated June 5, 1883.

Application filed June 12, 1882. (No specimens.)

To all whom it may concern:

Be it known that I, CHARLES E. PARSONS, of Medford, in the county of Middlesex and Commonwealth of Massachusetts, have invented certain new and useful improvements in the art of producing that chemical compound of antimony and sulphur which is commonly known as the "golden sulphuret of antimony;" but which, in technical nomenclature, is designated as the "pentasulphide of antimony."

This compound has usually been produced by treatment of the gray sulphide of antimony or native product known as "antimony glance," either in the crude condition of the ore or separated by fusion from the gangue with which it is found associated. Such gray sulphide, when chemically considered apart from impurities, is the trisulphide of antimony, and the pentasulphide has been produced therefrom in the following mode, among others: The native product, after being pulverized, is introduced, along with a quantity of free sulphur, into a solution of carbonate of potash or carbonate of soda made caustic by the addition of quicklime, and is boiled therein for several hours until the trisulphide of antimony and free sulphur so introduced have been dissolved. The solution thus obtained is freed from the lime and other sedimentary and insoluble substances either by allowing the latter to subside and drawing off the supernatant fluid or by filtration, and then it is treated with hydrochloric or sulphuric acid, which precipitates the golden sulphuret of antimony.

By this process, or any other heretofore known, very considerable proportions of the antimony and sulphur originally introduced into the alkaline solution remain unconverted into the golden sulphuret of antimony, and are consequently wasted; but by my process, hereinafter described, such waste is substantially prevented, and much time and labor saved besides.

The solvent which I employ is a saturated solution of caustic soda or of caustic potash, and I dissolve therein the native sulphide of antimony and the free sulphur separately, and afterward add the two solutions together. Thus: I introduce into a saturated solution of caustic soda a quantity of pulverized native sulphide of antimony, and stir or otherwise agitate the same therein until fully dissolved. I also introduce into another saturated solution of caustic soda a quantity of crude brimstone or free sulphur in any of its ordinary commercial forms, and dissolve the same therein by boiling or otherwise applying heat to facilitate the operation. I allow this sulphur solution to cool, and then pour it into the sulphide-of-antimony solution and stir the whole mixture to promote chemical reaction, which is attended with the evolution of considerable heat. When the fluid mass has cooled I dilute it largely with water and so reduce its specific gravity as to readily permit the insoluble impurities—such as rock, iron, and other foreign matters—to subside. The aqueous solution is then drawn off, and the golden sulphuret of antimony is precipitated therefrom by the introduction therein of either sulphuric or hydrochloric acid.

The proportions of the chemical reagents above mentioned which I have found best adapted to accomplish the desired results may be stated as follows: For each pound of pulverized native sulphide of antimony averaging about eighty-two per centum of trisulphide of antimony, I employ eight fluid ounces of saturated solution of caustic soda, and for every two pounds of free sulphur I employ a saturated solution of caustic soda containing one pound of anhydrous soda or sodic oxide. Of this sulphur solution I take eight fluid ounces for mixture with the trisulphide-of-antimony solution last above mentioned.

I have also found it desirable, in order to attain the best results, that the trisulphide of antimony should be dissolved in the saturated solution of caustic alkali at the temperature of about 60° Fahrenheit, and that the sulphur solution should be cooled down to about the same temperature when it is added to the antimonial solution.

Caustic potash may be substituted for caustic soda, or may be used in connection therewith; but the latter, being less expensive, would, for that reason, be preferred. The proportions of the caustic solvent employed may vary from those hereinabove specified; but any considerable variation therefrom would cause waste of material and be undesirable on the score of economy.

My process is distinguished from the old processes in several important particulars. The solvent employed is a saturated solution of caustic alkali. The trisulphide of antimony is dissolved therein not only without boiling, but at a cool temperature. The free sulphur is dissolved before being added to the antimonial solution. The reactions are such as to convert substantially all of the antimony and sulphur contained in the mixed solutions into the golden sulphuret of antimony or pentasulphide of antimony without material waste, and the whole process may be conducted and completed within a very short time—say from fifteen to twenty minutes, or even less.

I claim as my invention—

The improved process of producing golden sulphuret of antimony by dissolving native sulphide of antimony and free sulphur separately in saturated solutions of caustic alkali, and afterward adding the same together and treating the mixture with acid, substantially as described.

CHARLES E. PARSONS.

Witnesses:
FRANK O. MELCHER,
JOHN T. KENNERK.